United States Patent
Park et al.

(10) Patent No.: US 8,705,454 B2
(45) Date of Patent: Apr. 22, 2014

(54) MUTUAL BROADCAST PERIOD AND CONTENTION ACCESS PERIOD OPERATING SYSTEM AND METHOD FOR LOAD CONTROL

(75) Inventors: Seung-Hoon Park, Seoul (KR); Tae-Han Bae, Seoul (KR); Noh-Gyoung Kang, Seoul (KR); Jae-Seung Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 13/541,018

(22) Filed: Jul. 3, 2012

(65) Prior Publication Data

US 2013/0010595 A1    Jan. 10, 2013

(30) Foreign Application Priority Data

Jul. 5, 2011  (KR) .................. 10-2011-0066623

(51) Int. Cl.
*H04Q 7/00*   (2006.01)
*H04Q 7/24*   (2006.01)

(52) U.S. Cl.
USPC .......................................... 370/328; 370/338

(58) Field of Classification Search
USPC .......... 370/252, 254, 255, 279, 282, 328, 338
See application file for complete search history.

(56) References Cited

U.S. PATENT DOCUMENTS

| 7,715,352 B2 * | 5/2010 | Huang et al. .................. 370/338 |
| 2005/0135295 A1 * | 6/2005 | Walton et al. ................. 370/328 |
| 2011/0205998 A1 * | 8/2011 | Hart et al. ..................... 370/330 |

* cited by examiner

*Primary Examiner* — Hong Cho
(74) *Attorney, Agent, or Firm* — Jefferson IP Law, LLP

(57) ABSTRACT

A method and a system for operating a Mutual Broadcast Period (MBP) and Contention Access Period (CAP) for load control are provided. The proposed system and method is suitable for a short-range communication environment such as communication environment in or around the human body, and is for a mesh network communication environment in which one piconet is formed around the human body or a plurality of devices are connected. When signals carrying biometric information are periodically received from a plurality of sensor devices for medical purposes, the system and method may achieve efficient resource access by performing load control in a distributed manner, contributing to a reduction in access delay and power consumption and enabling appropriate QoS control.

18 Claims, 19 Drawing Sheets

| Octets: 2 | 1 | 4/10 | 0/5/6/10/14 | 2 | variable | variable | variable | 2 |
|---|---|---|---|---|---|---|---|---|
| Frame Control | Sequence Number | Addressing fields | Auxiliary Security Header | Superframe Specification | Pending address fields | Beacon Payload | MBP fields | FCS |
| MHR | | | | MAC Payload | | | | |

FIG.6

| Bits: 4 | 2 | 2 |
|---|---|---|
| MBZ/CAZ Count | MBZ Length | CAZ Length |

FIG.7

| Bits: 4 | 2 | 0/4 |
|---|---|---|
| MBZ/CAZ Count | MBZ Ending Slot | CAZ Ending Slot |

FIG.10

| Bits: 2 | 4 | 2 |
|---|---|---|
| MBP Order | MBZ/CAZ Count | CAZ Length |

FIG.12

| Bits: 2 | 4 | 0/4 |
|---|---|---|
| MBP Order | MBZ/CAZ Count | CAZ Ending Slot |

FIG.13

MUTUAL BROADCAST PERIOD AND CONTENTION ACCESS PERIOD OPERATING SYSTEM AND METHOD FOR LOAD CONTROL

PRIORITY

This application claims the benefit under 35 U.S.C. §119 (a) of a Korean patent application filed in the Korean Intellectual Property Office on Jul. 5, 2011 and assigned Serial No. 10-2011-0066623, the entire disclosure of which is hereby incorporated by reference.

BACKGROUND OF THE INVENTION

1. Field of the Invention

The preset invention relates to a method and apparatus in which a device terminal accesses a coordinator terminal in a communication system. More particularly, the present invention relates to a system and method supporting efficient operations of a plurality of sensor devices that periodically transmit sensing information in a Body Area Network (BAN).

2. Description of the Related Art

Wireless Body Area Network (WBAN), which is under standardization as an international standard called Institute of Electrical and Electronic Engineers (IEEE) 802.15.6 TG6 BAN, aims to provide medical services such as telemedicine services over a communication network formed around three meters or less from the body, and to provide entertainment services in which wearable equipment for wearable computing or motion sensors are used. In addition, WBAN is under similar standardization as an international standard called IEEE 802.15.4j Medical BAN (MBAN), and 802.15.4j is defined as an amendment standard for using the existing 802.15.4 in a Medical BAN Service (MBANS) band of 2.36~2.4 GHz.

WBAN generally includes a coordinator and a plurality of devices such as various types of sensors attachable to the body.

The main application of WBAN is to collect biometric information from medical sensors and to send the collected biometric information to medical institutions. A coordinator, which has a wire or wireless communication line connected to a medical institution server, sends data received from devices or sensors connected by WBAN to the medical institution server. For example, the coordinator may send the data received from the devices or sensors in an unprocessed form or after analyzing such data.

In the WBAN healthcare system, because small-sized devices equipped with a mobile power supply such as a battery are mainly handled, reducing (e.g., minimizing) the power consumption of the devices is an important system requirement. Generally, a low duty cycling technique may be applied, for low-power implementation. As an example, the small-sized devices may be sensors having poor power conditions.

FIG. 1 shows a data transmission process when it is operated by low duty cycling and when a beacon is used in an IEEE 802.15.4 WBAN according to the related art.

Referring to FIG. 1, when the data transmission process is operated by low duty cycling, the lower the duty cycling, the greater the number of nodes that have data during an inactive period. At the starting point of the next active period, the system attempts to transmit all of the data.

As described above, in the WBAN according to the related art, when data is transmitted by low duty cycling, many nodes may have data during an inactive period due to the low duty cycling. Consequently, transmission of all of this data is attempted in the next active period.

In this case, the WBAN according to the related art may deal with contention with the fixed initial backoff settings, for packet transmission. However, when the concentration of traffic is severe, it is difficult to solve this problem with the initial backoff settings which were made without recognizing this problem.

In addition, when a number of packet transmission attempts rapidly increases in the next active period, the packet transmission attempts are concentrated at the same time in a Contention Access Period (CAP). Accordingly, traffic may occur during the packet transmission.

Therefore, a need exists for an apparatus and method for controlling resource access by devices such that in a WBAN in which periodic data transmission is made, a plurality of devices may be prevented from causing a reduction in performance such as delays due to their excessive collisions in a Contention Access Period CAP The above information is presented as background information only to assist with an understanding of the present disclosure. No determination has been made, and no assertion is made, as to whether any of the above might be applicable as prior art with regard to the present disclosure.

SUMMARY OF THE INVENTION

Aspects of the present invention are to address at least the above-mentioned problems and/or disadvantages and to provide at least the advantages described below. Accordingly, an aspect of the present invention is to provide a system and method for controlling resource access by devices such that in a Wireless Body Area Network (WBAN) in which periodic data transmission is made, a plurality of devices may be prevented from causing a reduction in performance such as delays due to their excessive collisions in a Contention Access Period (CAP).

In accordance with an aspect of the present invention, a coordinator in a Mutual Broadcast Period (MBP) and CAP operating system for load control is provided. The coordinator includes a Radio Frequency (RF) unit for broadcasting a beacon frame, and a controller for determining whether contention for data transmission in a CAP due to backlogged traffic increases, by recognizing the number of connected devices, for broadcasting a beacon frame including information about an MBP used for load control to each device through the RF unit before the CAP if the contention for data transmission increases, for determining whether a load control broadcast message for determining existence of data load is received in the MBP from the device without error, and for sending a response to the load control broadcast message to the device.

In accordance with another aspect of the present invention, a device in a MBP and CAP operating system for load control is provided. The device includes a RF unit for receiving a beacon frame broadcasted from a coordinator, and a controller for sending a load control broadcast message for determining existence of data load to the coordinator in an MBP based on information about the MBP upon receiving a beacon frame including information about an MBP used for load control from the coordinator before a CAP, for determining a type of a CAP depending on whether sending of the load control broadcast message is successful and whether packet transmission by other devices is successful, and for performing data transmission using a CAP corresponding to the determined CAP type.

In accordance with another aspect of the present invention, a method for operating a MBP and CAP for load control in a coordinator is provided. The method includes determining whether contention for data transmission in a CAP due to backlogged traffic increases, by recognizing the number of connected devices, broadcasting a beacon frame including information about an MBP used for load control to each device before the CAP, if the contention for data transmission increases, determining whether the load control broadcast message is received without error, and sending a response to the load control broadcast message to the device.

In accordance with another aspect of the present invention, a method for operating a MBP and CAP for load control in a device is provided. The method includes receiving a beacon frame including information about an MBP used for load control from a coordinator before a CAP, sending a load control broadcast message for determining existence of data load to the coordinator in the MBP based on information about the MBP, determining a type of a CAP depending on whether sending of the load control broadcast message is successful and whether packet transmission by other devices is successful, and performing data transmission using a CAP corresponding to the determined CAP type.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 6 shows a structure of a beacon frame according to an exemplary embodiment of the present invention;

FIG. 7 shows a structure of an MBP field according to a first exemplary embodiment of the present invention;

FIG. 10 shows a structure of an MBP field according to a second exemplary embodiment of the present invention;

FIG. 12 shows a structure of an MBP field according to a third exemplary embodiment of the present invention;

FIG. 13 shows a structure of an MBP field according to a fourth exemplary embodiment of the present invention;

Throughout the drawings, in should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
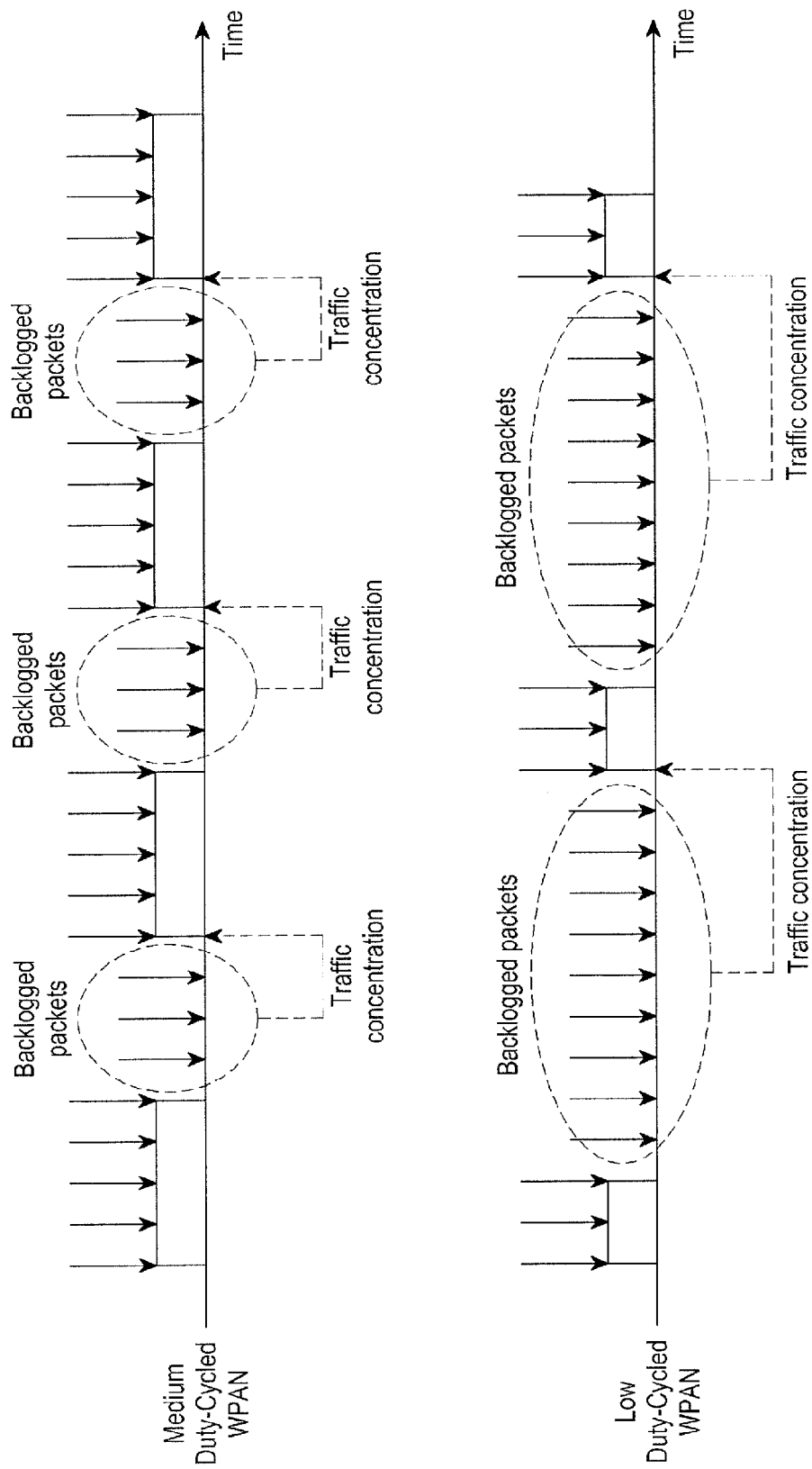
FIG. 1 shows a data transmission process when it is operated by low duty cycling and when a beacon is used in an IEEE 802.15.4 Wireless Body Area Network (WBAN) according to the related art.
Figure 2:
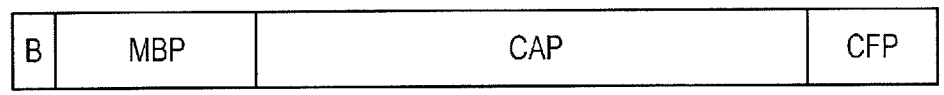
FIG. 2 shows a structure of a superframe including a Mutual Broadcast Period (MBP) according to an exemplary embodiment of the present invention.

FIG. 2 shows a structure of a superframe including a Mutual Broadcast Period (MBP) according to an exemplary embodiment of the present invention.

Referring to FIG. 2, the superframe includes a beacon frame B, an MBP, a Contention Access Period (CAP), and a Contention Free Period (CFP).

In an exemplary embodiment of the present invention, the MBP is established between the beacon frame B and the Contention Access Period (CAP) as shown in FIG. 2. Thus, before entering the CAP, devices may exchange information with each other, thereby ensuring proper load control in the CAP.

Queue information about the number of packets accumulated thus far is sent in the MBP, thereby preventing transmission attempts from being concentrated at the same time in the CAP.

In the exemplary embodiment of the present invention, load control in the CAP is made naturally in a distributed manner depending on the information that the devices have exchanged in the MBP.

According to exemplary embodiments of the present invention, the MBP is smaller than the CAP in time period. As example, with regard to a length of the MBP, the coordinator may inform the devices of the length of the MBP by adding a field indicating the length of the MBP in the beacon frame B and including information about the length of the MBP or information about a start point of the CAP in the added field. This MBP operates by Carrier Sense Multiple Access-Collision Avoidance (CSMA-CA) similarly to the CAP, but the MBP may be set so as to consider light contention situations such as making a length of a backoff slot short because the MBP does not require transmission of a lot of data.

Figure 3:
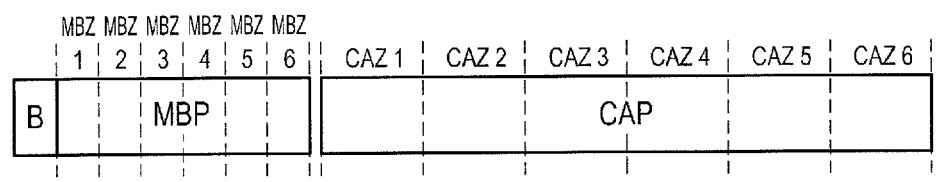
FIG. 3 shows a superframe configured by dividing an MBP into Mutual Broadcast Zones (MBZs) and a Contention Access Period (CAP) into Contention Access Zones (CAZs) according to an exemplary embodiment of the present invention.

FIG. 3 shows a superframe configured by dividing an MBP into Mutual Broadcast Zones (MBZs) and a CAP into Contention Access Zones (CAZs) according to an exemplary embodiment of the present invention.

Referring to FIG. 3, the superframe includes a beacon frame B, an MBP, and a CAP. The MBP includes at least one MBZ and the CAP includes at least one CAZ.

Exemplary embodiments of the present invention propose MBZs and CAZs, for balanced load control. An MBZ corresponds to each of N zones obtained by dividing an MBP. Similarly, a CAZ corresponds to each of N zones obtained by dividing a CAP. MBZs correspond to CAZs on a one-to-one basis.

For example, assume that the coordinator sets 6 MBZs in an MBP and 6 CAZs in a CAP.

These MBZs and CAZs are used as a tool for load balancing, through load control. As an example, MBZ #1 corresponds to CAZ #1, MBZ #2 corresponds to CAZ #2, and in this way, MBZ #6 corresponds to CAZ #6.

One MBZ will be described in detail with reference to FIG. 4.

Figure 4:
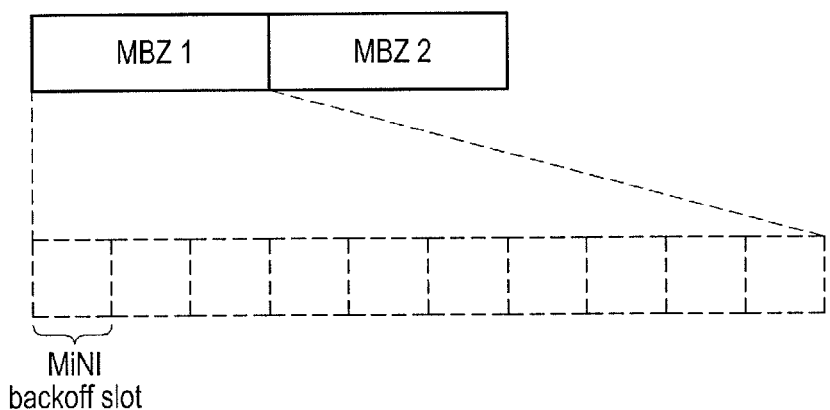
FIG. 4 shows a structure of one MBZ according to an exemplary embodiment of the present invention.

FIG. 4 shows a structure of one MBZ according to an exemplary embodiment of the present invention.

Referring to FIG. 4, one MBZ includes a plurality of mini backoff slots. When attempting to transmit data in an MBZ, a device transmits data at the boundary of a mini backoff slot in accordance with a slotted CSMA-CA operation.

According to exemplary embodiments of the present invention, the data that a plurality of devices attempt to send in one MBZ, includes queue information of each device, and a device detects transmission by other devices based on the slotted CSMA-CA operation, and transmits data by a backoff algorithm. However, when there are a large number of devices, the devices may not transmit data in an MBZ.

Figure 5:
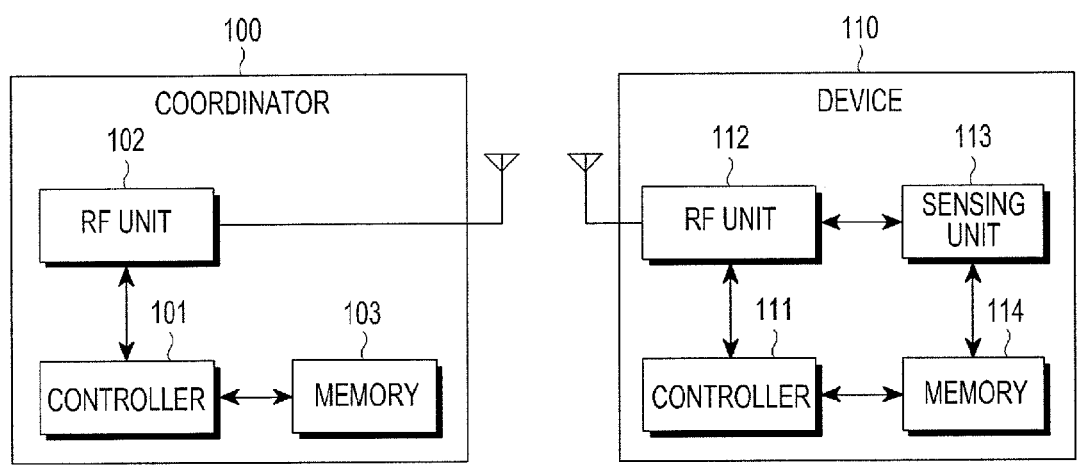
FIG. 5 shows a structure of a coordinator and a device according to an exemplary embodiment of the present invention.

FIG. 5 shows a structure of a coordinator and a device according to an exemplary embodiment of the present invention.

Referring to FIG. 5, a coordinator 100 includes a controller 101, a Radio Frequency (RF) unit 102, and a memory 103, and a device 110 includes a controller 111, an RF unit 112, a sensing unit 113, and a memory 114.

According to exemplary embodiments of the present invention, if the controller 101 in the coordinator 100 expects an increase in contention by data transmission in a CAP due to backlogged traffic by recognizing the number of connected devices, the controller 101 informs the devices of the expected increase in contention by including MBP information in a beacon frame B. For example, the MBP information includes a period length and the number of MBZs.

Thereafter, upon receiving a queue information packet sent for load control from the device 110 without error, the controller 101 sends a response or an Acknowledgement (ACK) to the device 110. If there is traffic that the coordinator 100 desires to send to the device 110, the controller 101 sets a destination address as a broadcast address, sends a broadcast message to the broadcast address, and sends no ACK to the device 110 that has received the broadcast message. The queue information packet includes an indicator indicating a control packet sent in an MBP, and may further include a queue length associated with Quality of Service (QoS), a traffic type, a battery status, and the like. The queue information packet includes queue information in terms of other utilizations of an MBZ, and in fact, only for load control resource access, the queue information may be minimized or not. The queue information packet may be called a 'load control broadcast message'.

The RF unit 102 in the coordinator 100 broadcasts a beacon frame B, and sends an ACK to the device 110 upon receiving a queue information message from the device 110.

The memory 103 in the coordinator 100 stores information used for data transmission, and may store MBP information such as a period length and the number of MBZs.

Next, the controller 111 in the device 110 obtains MBP information from the coordinator 100, finds the required amount of resources needed for packet transmission, and then determines the number of CAZs based thereon. Thereafter, the controller 111 arbitrarily selects one or multiple MBZs, the number of which corresponds to the found number of CAZs, from among all MBZs.

To transmit a packet in a CAP, the controller 111 first transmits a message packet including queue information to the coordinator 100 in a mini backoff slot at an MBZ point selected from a total of N MBZs in an MBP.

Upon receiving an ACK from the coordinator 100, the controller 111 determines whether to use a CAZ corresponding to the MBZ as an Exclusive CAP, and stores it in the memory 114. Upon receiving no ACK from the coordinator 100, the controller 111 retries the packet transmission, considering that a Negative Acknowledgement (NACK) is received. If the transmission in the selected MBZ is not successful, the controller 111 selects again one of the remaining unselected MBZs. The term 'Exclusive CAP' as used herein may refer to a period in which the device 110 may transmit more data than an amount of data, which is set by default.

While not transmitting its queue information packet in the selected MBZ, the controller 111 receives queue information packets from other devices in a listening state, and upon receiving ACKs for the queue information packets from the coordinator 100, the controller 111 stores the queue information packets in the memory 114. This may be used when the controller 111 adjusts CSMA-CA variables in a CAP.

The controller 111 performs listening only, in the unselected MBZs. If there is no queue information packet that the device 110 has transmitted in the MBZ and received an ACK therefor, the controller 111 determines to use a CAZ corresponding to the MBZ as a Normal CAP. The term "Normal CAP' as used herein may refer to a period in which the device 110 may transmit data in the amount of data, which is set by default.

If the device 110 fails to transmit the queue information packet in all MBZs, the controller 111 determines to use the full CAP as a Background CAP. The term 'Background CAP' as used herein may refer to a period in which the device 110 may transmit data in the remaining period among the entire data transmission period.

The RF unit 112 in the device 110 is configured to transmit and receive information. For example, the RF unit 112 receives a beacon frame broadcasted from the coordinator 100, transmits a queue information packet to the coordinator 100 in each MBZ corresponding to each CAZ, and receives an ACK from the coordinator 100.

The sensing unit 113 in the device 110 outputs sensed data to the controller 111.

The memory 114 in the device 110 stores information needed for data transmission, and may store the queue information packet received from the coordinator 100. The memory 114 stores in advance CAP information corresponding to the transmission results of the queue information packet. For example, the CAP information includes an Exclusive CAP, a Normal CAP and a Background CAP.

As a result, exemplary embodiments of the present invention may enable efficient resource access by performing load control in a distributed manner for data transmission/reception, contributing to a reduction in access delay and power consumption and enabling appropriate QoS control.

A structure of the above-described beacon frame B will be described in detail below with reference to FIG. 6.

FIG. 6 shows a structure of a beacon frame according to an exemplary embodiment of the present invention.

Referring to FIG. 6, the beacon frame includes a field for Frame Control, a field for Sequence Number, an Addressing field, an Auxiliary Security Header, a field for Superframe Specification, a Pending address field, a Beacon Payload, an MBP field, a Frame Check Sequence (FCS). The beacon frame may also include a GTS field.

According to exemplary embodiments of the present invention, it is appropriate for the MBP field to include variable fields, similarly to GTS fields, rather than the Superframe Specification field giving information, because the MBP field is a field newly added to the existing specification. Details and structure of the MBP field will be described in detail below with reference to FIGS. 7 to 15.

FIG. 7 shows a structure of an MBP field according to a first exemplary embodiment of the present invention.

A MBZ/CAZ Count field (with 4 bits, having a value of 0 to 15) indicates the number of MBZs/CAZs.

A MBZ Length field indicates a length of one MBZ on a slot basis.

A CAZ Length field indicates a length of one CAZ on a slot basis.

Referring to FIG. 7, if MBZ/CAZ Count is 3, MBZ length is 1, and CAZ length is 4, then slots #0 to #2 operate as an MBP, slots #3 to #14 operate as CAZs corresponding to MBZs, and the remaining slot #15 may operate as a Normal CAP.

Figure 8:
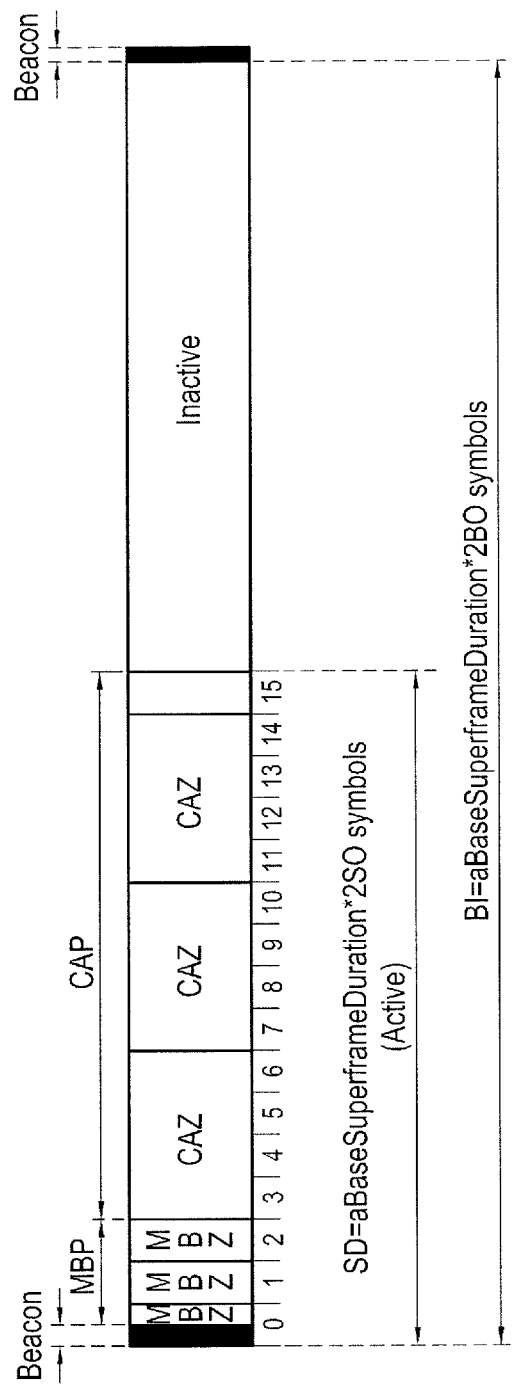
FIG. 8 shows a structure of a superframe including the MBP field and having no GTS according to the first exemplary embodiment of the present invention.
Figure 9:
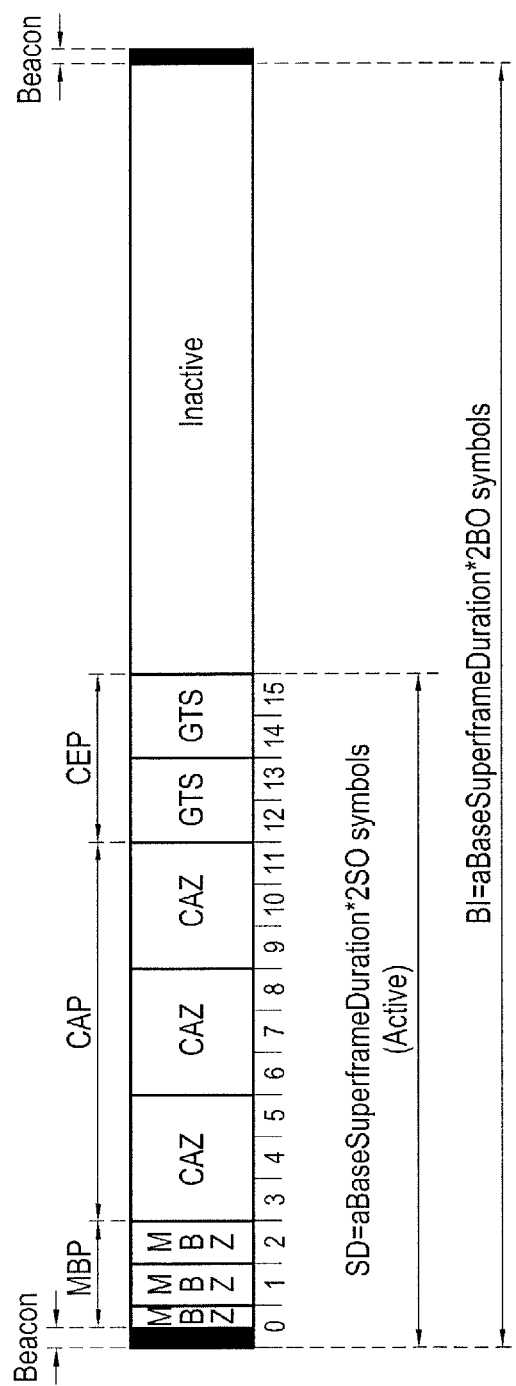
FIG. 9 shows a structure of a superframe including the MBP field and having a GTS according to the first exemplary embodiment of the present invention.

Two different types of superframes including the MBP field according to a first exemplary embodiment of the present invention may be represented as shown in FIGS. 8 and 9. FIG. 8 shows a type of a superframe without GTS, and FIG. 9 shows a type of a superframe to which GTS is applied.

FIG. 8 shows a structure of a superframe including the MBP field and having no GTS according to the first exemplary embodiment of the present invention. FIG. 9 shows a structure of a superframe including the MBP field and having a GTS according to the first exemplary embodiment of the present invention.

Referring to FIG. 8, the superframe includes a beacon frame, an MBP, and a CAP. The MBP includes at least one MBZ and the CAP includes at least one CAZ.

Referring to FIG. 9, the superframe includes a beacon frame, an MBP, and a CAP, and a GTS. For example, the GTS may be included in a Circuit Emulation over Packet (CEP). The CEP may include a plurality of GTSs.

FIG. 10 shows a structure of an MBP field according to a second exemplary embodiment of the present invention.

Referring to FIG. 10, the MBP field includes an MBZ/CAZ Count, an MBZ Ending Slot, and a CAZ Ending Slot.

MBZ Ending Slot indicates the last slot among the existing 16 available slots, which is to be used for an MBP.

CAZ Ending Slot indicates a slot of the last CAZ in a CAP.

Although a first exemplary embodiment of the present invention is similar to a second exemplary embodiment of the present invention, when the CAZ Ending Slot is not defined, a CAP from the next slot of MBZ Ending Slot to the final CAP slot of the Superframe Specification field will be divided by a number in the MBZ/CAZ Count field in the same length.

When the CAZ Ending Slot is defined, if the CAZ Ending Slot is greater than the final CAP slot, it is regarded as the same value as that of the final CAP slot, and a CAP from the next slot of MBZ Ending Slot to CAZ Ending Slot will be divided by a number in the MBZ/CAZ Count field in the same length. In this case, a CAZ length will not be a multiple of a superframe slot. An MBP from 0 to MBZ Ending Slot is also divided by a number in the MBZ/CAZ Count field in the same length and used as MBZ field.

When the MBP field according to a second exemplary embodiment of the present invention is used, for each MBZ/CAZ, a CAP from the next slot of MBZ Ending Slot to a superframe slot designated by CAZ Ending Slot will be divided by a number in the MBZ/CAZ Count field in the same length.

Figure 11:
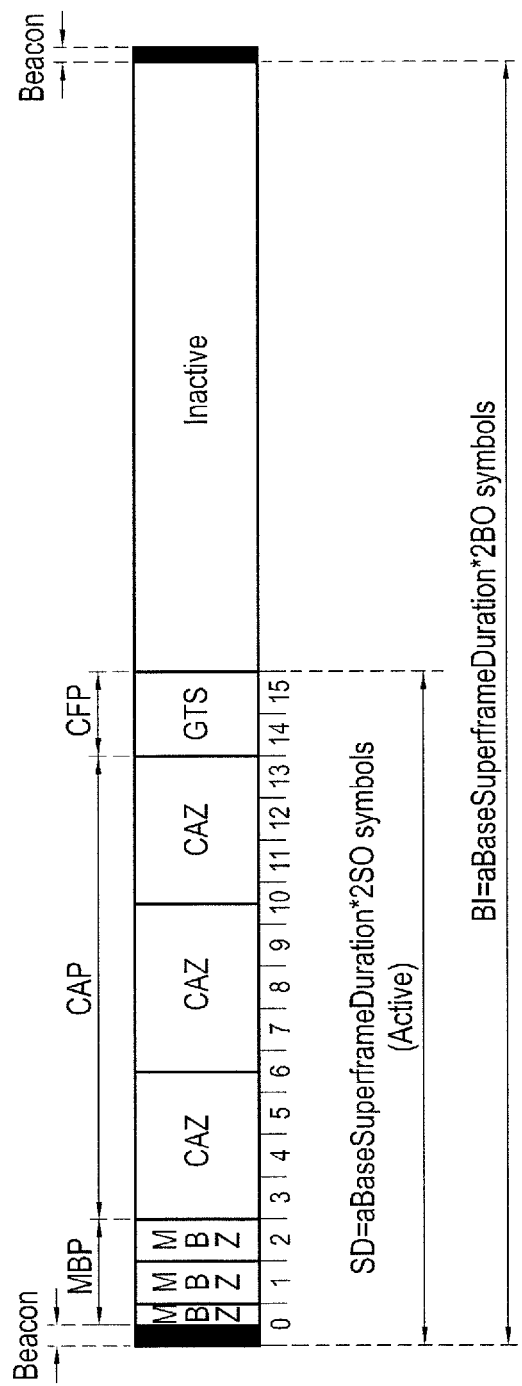
FIG. 11 shows a structure of a superframe according to the second exemplary embodiment of the present invention.

A superframe including the MBP field according to the second exemplary embodiment of the present invention may be represented as shown in FIG. 11.

FIG. 11 shows a structure of a superframe according to the second exemplary embodiment of the present invention.

Referring to FIG. 11, the superframe includes a beacon field, an MBP, a CAP, and a GTS. The MBP field includes at least one MBZ, and the CAP includes at least one CAZ. As an example, the GTS may be included in a CFP.

In addition, MBP Duration (MD) determined by an MBP Order value rather than based on the superframe slot as in the above-described first and second exemplary embodiments of the present invention may be configured with an MBP. An MBP Order field is a field used to adjust a size of the superframe, and an MBP Order value may be determined by the user or the coordinator's algorithm, like the superframe order or beacon order, and may have 2 bits in an exemplary embodiment of the present invention.

The configured MBP fields may be represented as shown in FIGS. 12 and 13.

FIG. 12 shows a structure of an MBP field according to a third exemplary embodiment of the present invention, and FIG. 13 shows a structure of an MBP field according to a fourth exemplary embodiment of the present invention.

Referring to FIG. 12, the MBP field includes an MBP Order, an MBZ/CAZ Count, and a CAZ Length.

Referring to FIG. 13, the MBP field includes an MBP Order, an MBZ/CAZ Count, and a CAZ Ending Slot.

Similarly to Superframe Duration (SD) and Beacon Interval (BI), MD may be calculated by Equation (1) below.

$$MD = aBaseSuperframeDuration * 2^{MO} \text{ symbols} \qquad (1)$$

An MBP is inserted as a new period ahead of a CAP before a start of a superframe slot #0 depending on the calculated MD, and other fields in the MBP field according to the third and fourth exemplary embodiments of the present invention are the same as those in the MBP field according to the first and second exemplary embodiments of the present invention.

Figure 14:
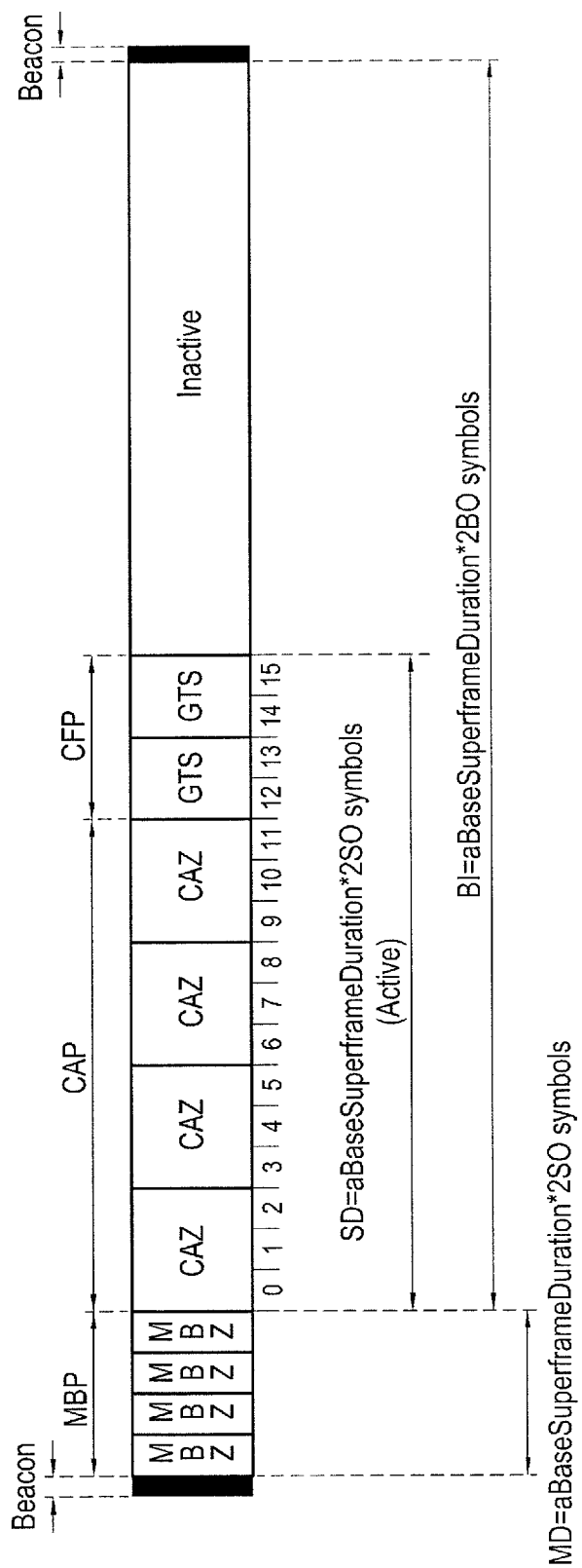
FIG. 14 shows a structure of a superframe according to the third exemplary embodiment of the present invention.
Figure 15:
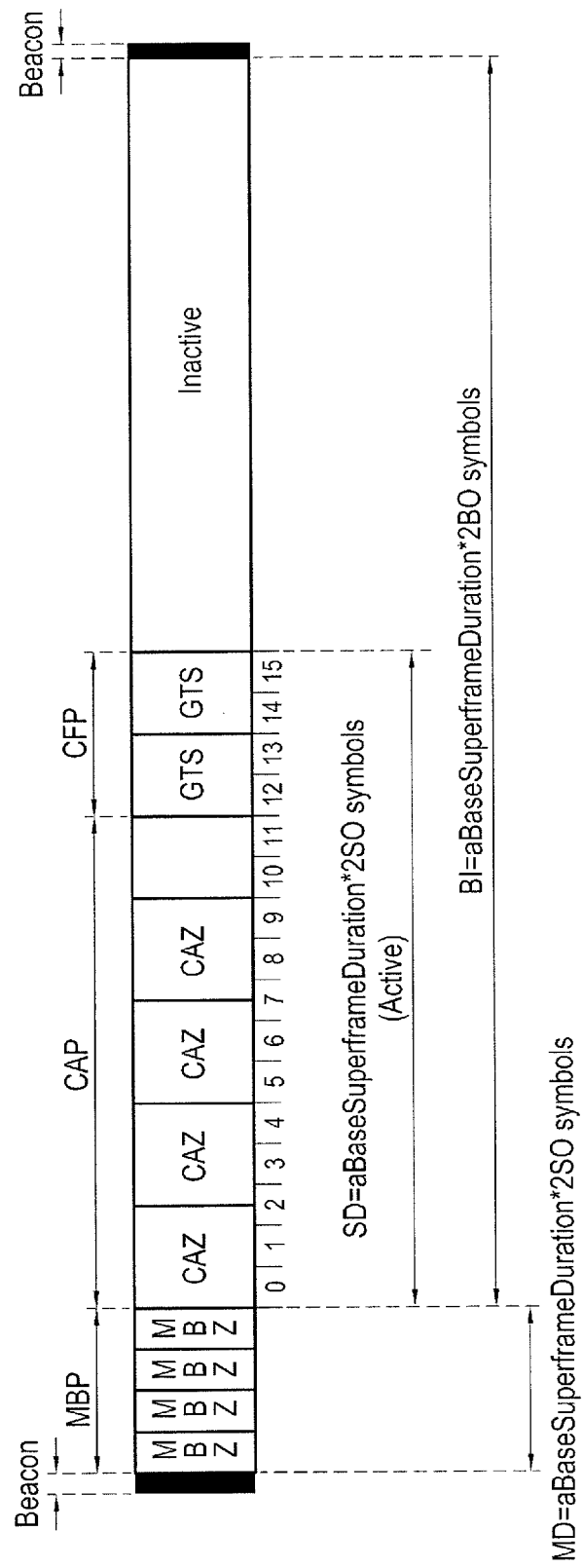
FIG. 15 shows a structure of a superframe according to the fourth exemplary embodiment of the present invention.

Superframes including the MBP fields according to the third and fourth exemplary embodiments of the present invention may be represented as shown in FIGS. 14 and 15.

FIG. 14 shows a structure of a superframe according to the third exemplary embodiment of the present invention, and FIG. 15 shows a structure of a superframe according to the fourth exemplary embodiment of the present invention.

Referring to FIG. 14, the superframe includes a beacon field, an MBP, a CAP, and a GTS. The MBP may include at least one MBZ, and the CAP may include at least one CAZ. As an example, the GTS may be included in a CFP.

Referring to FIG. 15, the superframe includes a beacon field, an MBP, a CAP, and a GTS. The MBP may include at least one MBZ, and the CAP may include at least one CAZ. As an example, the GTS may be included in a CFP.

An operation of the device will be described in detail below with reference to FIG. 16.

Figure 16:
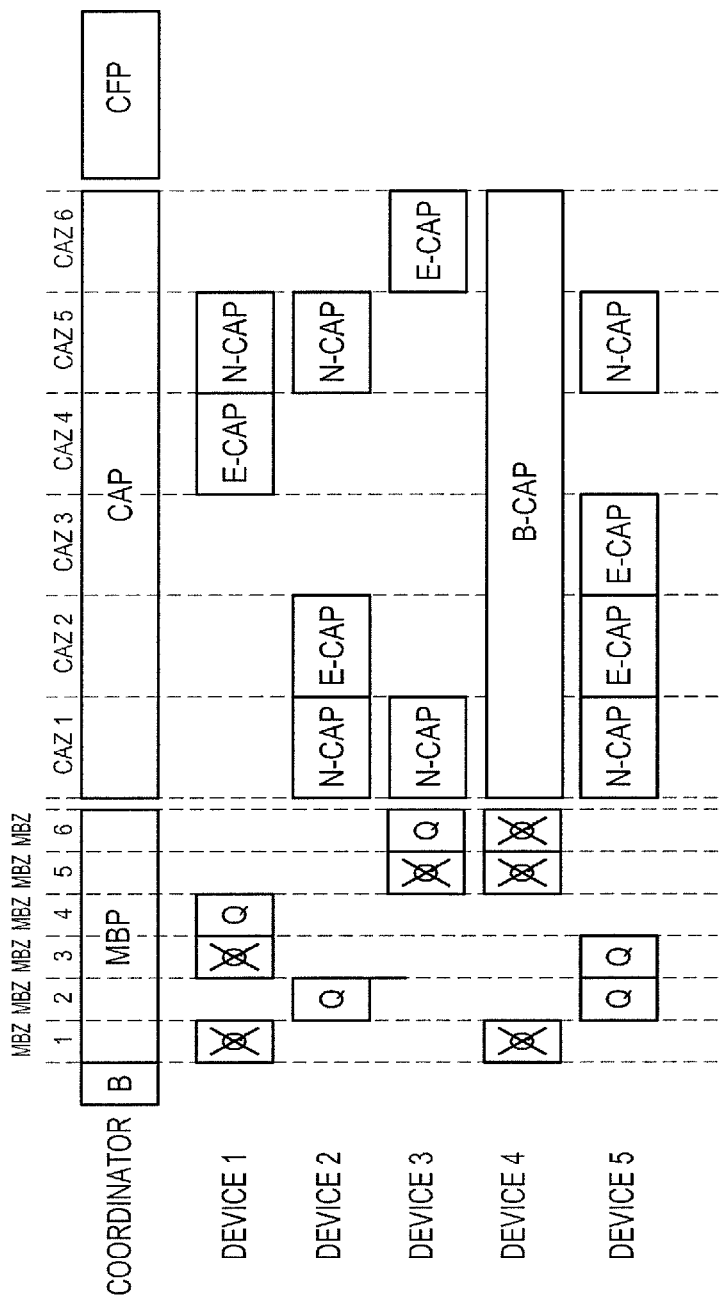
FIG. 16 shows a process of performing load control using an MBP according to an exemplary embodiment of the present invention.

FIG. 16 shows a process of performing load control using an MBP according to an exemplary embodiment of the present invention.

According to exemplary embodiments of the present invention, if a plurality of devices attempt transmission of a queue information packet in one MBZ, all or some of the attempting devices may succeed in the attempts, or all of the attempting devices may fail in the attempts.

When all of the attempting devices succeed in the attempts, all of the devices operate in a CAP corresponding to an Exclusive CAP (E-CAP). However, when there are a large number of devices, only some of the devices may succeed in the attempts generally, because it will be unlikely that all of the devices may succeed in the attempts. Some devices having succeeded in the attempts may operate in a CAP corresponding to an Exclusive CAP, but the remaining devices having failed in the attempts may not use the associated CAZs. If all of the devices have failed in their respective attempts, the devices having made the attempts may not use the associated CAZs. However, the devices, which have been performing listening instead without making the attempts, may use the associated CAZs as a Normal CAP. The devices, which have finally failed in transmission in an MBP because they have failed in transmission in all MBZs where they attempted the transmission, may use the entire CAP as a Background CAP.

Referring to FIG. 16, it is assumed that a superframe is divided into 6 CAZs in a CAP and 6 MBZs in an MBP, and as the coordinator broadcasts this information to devices, the devices recognize the information in advance.

For example, in a case in which first and fourth devices delivered a Queue (Q) information packet to the coordinator in MBZ #1 among 6 MBZs in an MBP, second, third and fifth devices determine to transmit data using a Normal CAP N-CAP at CAZ #1 in a CAP, when no ACK is received from the coordinator.

In a case in which second and fifth devices delivered a Q information packet to the coordinator in MBZ #2 among 6 MBZs in an MBP, the second and fifth devices determine to transmit data using an Exclusive CAP E-CAP at CAZ #2 in a CAP upon receiving an ACK from the coordinator.

In a case in which first and fifth devices delivered a Q information packet to the coordinator in MBZ #3 among 6 MBZs in an MBP, only the fifth device determines to transmit data using an Exclusive CAP E-CAP at CAZ #3 in a CAP, if no ACK is received at the first device from the coordinator and an ACK is received at the fifth device from the coordinator.

In a case in which a first device delivered a Q information packet to the coordinator in MBZ #4 among 6 MBZs in an MBP, only the first device determines to transmit data using an Exclusive CAP E-CAP at CAZ #4 in a CAP if an ACK is received at the first device from the coordinator.

In a case in which third and fourth devices delivered a Q information packet to the coordinator in MBZ #5 among 6 MBZs in an MBP, first, second and fifth devices determine to transmit data using a Normal CAP N-CAP at CAZ #5 in a CAP if no ACK is received from the coordinator.

In a case in which third and fourth devices delivered a Q information packet to the coordinator in MBZ #6 among 6 MBZs in an MBP, only the third device determines to transmit data using an Exclusive CAP E-CAP at CAZ #6 in a CAP, if an ACK is received at the third device from the coordinator and no ACK is received at the fourth device from the coordinator.

The fourth device, which has failed in transmission of a Q information packet at all of 6 MBZs in an MBP, determines to transmit data using a Background CAP (B-CAP) in a CAP.

As described above, an operation in a CAP is based on the CSMA-CA resource access scheme which is defined according to each of the Exclusive CAP, Normal CAP and Background CAP determined in an MBP in advance. Although the detailed operation in each period will not be described herein, it is general that an Exclusive CAP may be set for a device to attempt resource access more strongly than usual, and a Background CAP may be set for a device to attempt resource access more weakly than usual. In this regard, the Exclusive CAP, Normal CAP and Background CAP may have, for example, the following variables and algorithms. Specifically, CSMA-CA algorithms, in which the foregoing is reflected, will be described with reference to FIGS. 17A, 17B, 18A and 18B. Operations on the CSMA-CA algorithms in FIGS. 17A, 17B, 18A and 18B are the same as an operation of the general CSMA-CA algorithm, and variables and algorithm setting values by the Exclusive CAP and Background CAP will be applied as described below.

Figure 17A:
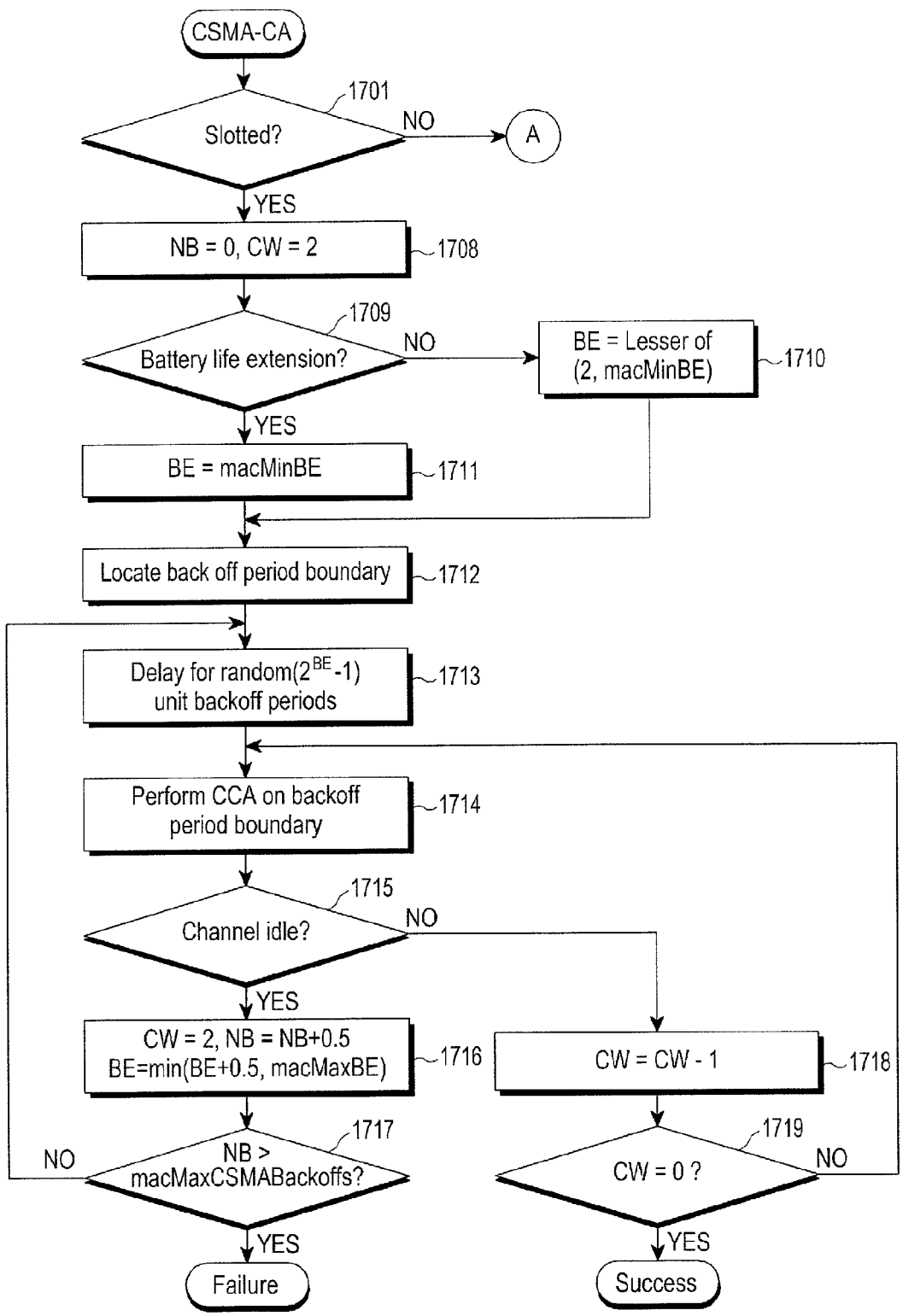
FIGS. 17A and 17B show a flow diagram of a Carrier Sense Multiple Access-Collision Avoidance (CSMA-CA) algorithm in an Exclusive CAP according to an exemplary embodiment of the present invention.
Figure 17B:
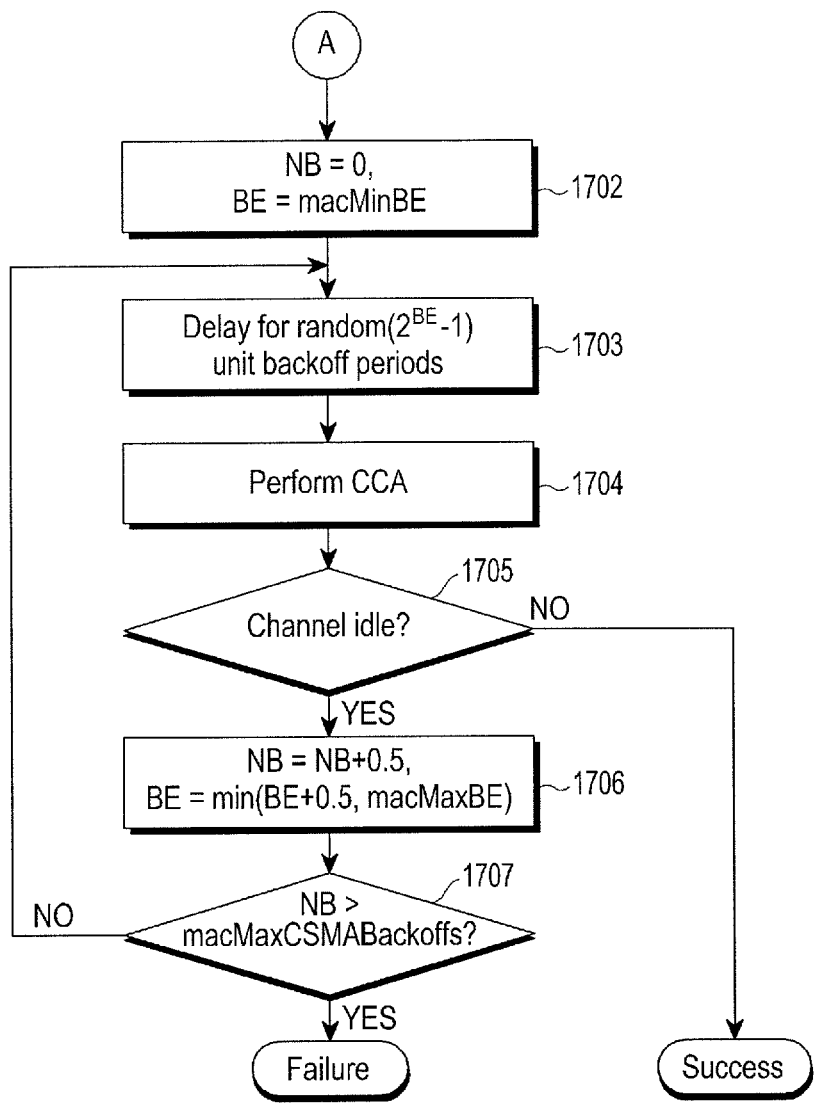

FIGS. 17A and 17B show a flow diagram of a CSMA-CA algorithm in an Exclusive CAP according to an exemplary embodiment of the present invention.

Referring to FIG. 17A, at step 1701 it is determined whether a CSMA-CA operation is a slotted CSMA-CA operation. If it is a slotted CSMA-CA operation, then the process proceeds to step 1708. At step 1708, the NB may be set such that NB=0, and CW may be set such that CW=2. Upon setting NB and CW, the process proceeds to step 1709. At step 1709, it is determine whether battery life extension is required. If battery life extension is not required, then the process proceeds to step 1710 at which BE may be set such that BE=less of (2, macMinBE) and thereafter the process proceeds to step 1712. If at step 1709, it is determined that battery life extension is required, then BE may be set such that BE=macMinBE at step 1711. Thereafter, the process proceeds to step 1712. At step 1712, the back off period boundary is located and the process proceeds to step 1713. At step 1713, a delay for a random number of backoff periods is performed. For example, the delays may be such that a delay of random $(2^{BE}-1)$ unit backoff periods is performed. After the delay, the process proceeds to step 1714 at which a CCA on backoff period boundary is performed and the process proceeds to step 1715. At step 1715, it is determined whether a channel is idle.

Referring to FIG. 17A, if the channel is determined to be idle at step 1715, the process proceeds to step 1716 at which an Exclusive CAP is set less than a Normal CAP in terms of setting values: macMinBE and macMaxBE, and in a BE incremental equation in step 1716, BE may be set such that BE=min(BE+0.5, macMaxBE), and maxCSMAbackoffs is set large. In an NE incremental equation in step 1716, NB may be set such that NB=NB+0.5. When NB or BE is used, their integers may be taken and used. After step 1716, the process proceeds to step 1717 at which it is determined whether NB is greater than macMaxCSMABackoffs. If NB is not greater than macMaxCSMABackoffs, then the process returns to step 1713. If NB is greater than macMaxCSMA-Backoffs, then the process ends in failure.

If the channel is determined to not be idle at step 1715, then the process proceeds to step 1718 at which CW may be set such that CW=CW-1. After the CW is set, the process proceeds to step 1719 at which it is determined whether CW=0. If CW is determined to not equal 0, then the process returns to step 1714. However, if CW is determined to equal 0, then the process ends in success.

Referring to FIGS. 17A and 17B, if at step 1701 it is determined that the CSMA-CA operation is not slotted, then the process proceeds to step 1702. At step 1702, the NB may be set such that NB=0 and ME may be set such that BE=macMinBe. Thereafter, the process proceeds to step 1703 at which a delay is performed. As an example, the delay may be for a number of unit backoff periods corresponding to random($2^{BE}-1$). Thereafter, the process proceeds to step 1704 at which a CCA is performed. After performing the CCA, the process proceeds to step 1705 at which it is determined whether the channel is idle. If the channel is determined to be idle at step 1705, then the process proceeds to step 1706 at which NB may be set such that NB=NB+0.5 and BE may be set such that BE=min(BE+0.5, macMaxBE). Thereafter, the process proceeds to step 1707 at which it is determined whether NB is greater than macMaxCSMABackoffs. If it is determined that NB is not greater than macMaxCS-MABackoffs, then the process returns to step 1703. If NB is determined to be greater than macMaxCSMABackoffs, then the process ends in failure.

Conversely, if at step 1705 it is determined that the channel is idle, then the process ends in success.

According to exemplary embodiments of the present invention, a Normal CAP is the same as macMinBE, macMaxBE, and maxCSMAbackoffs values used by the existing CSMA-CA algorithm in a CAP. BE has min([BE+1], macMaxBE) and NB has NB+1.

Figure 18A:
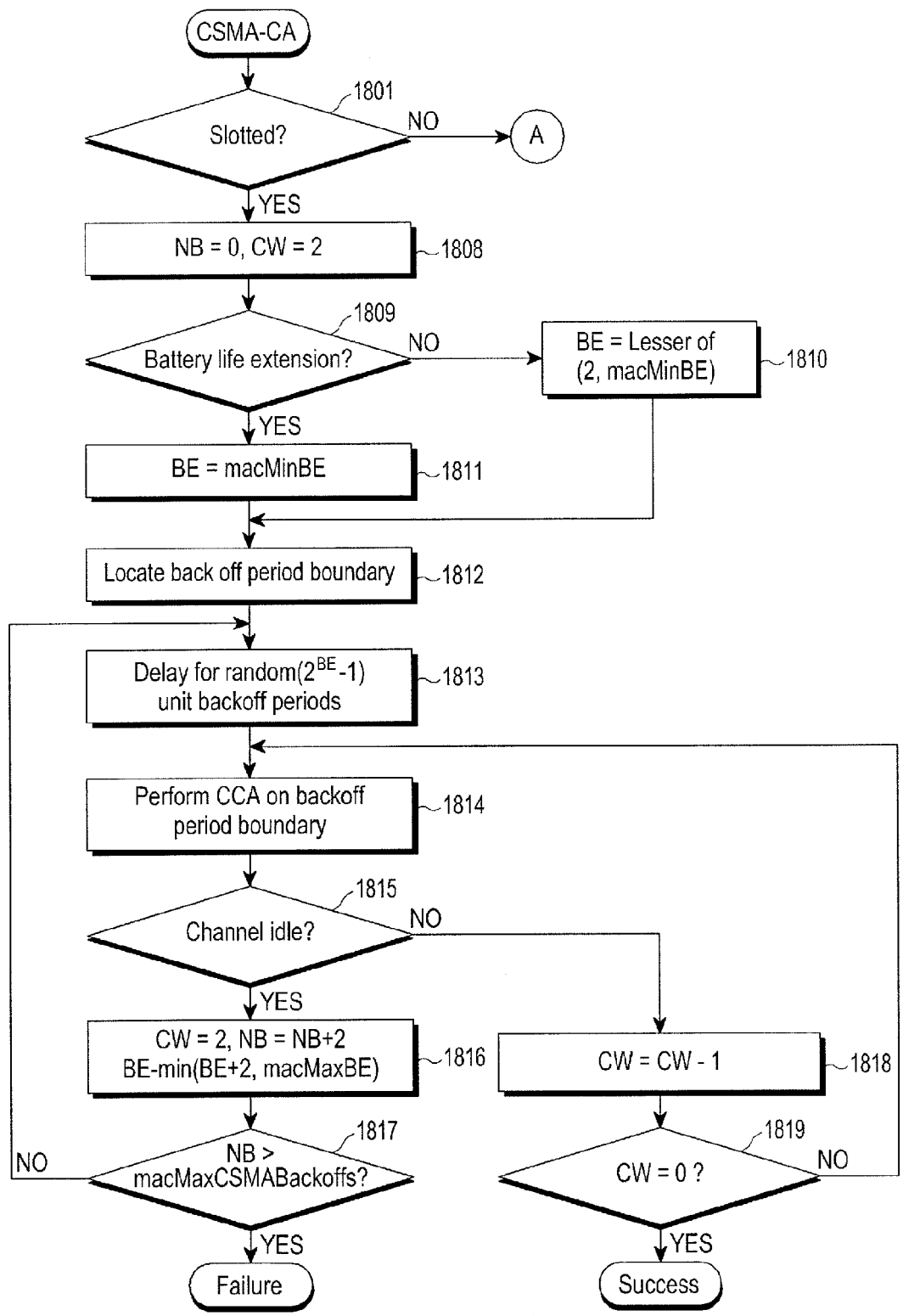
FIGS. 18A and 18B show a flow diagram of a CSMA-CA algorithm in a Background CAP according to an exemplary embodiment of the present invention.
Figure 18B:
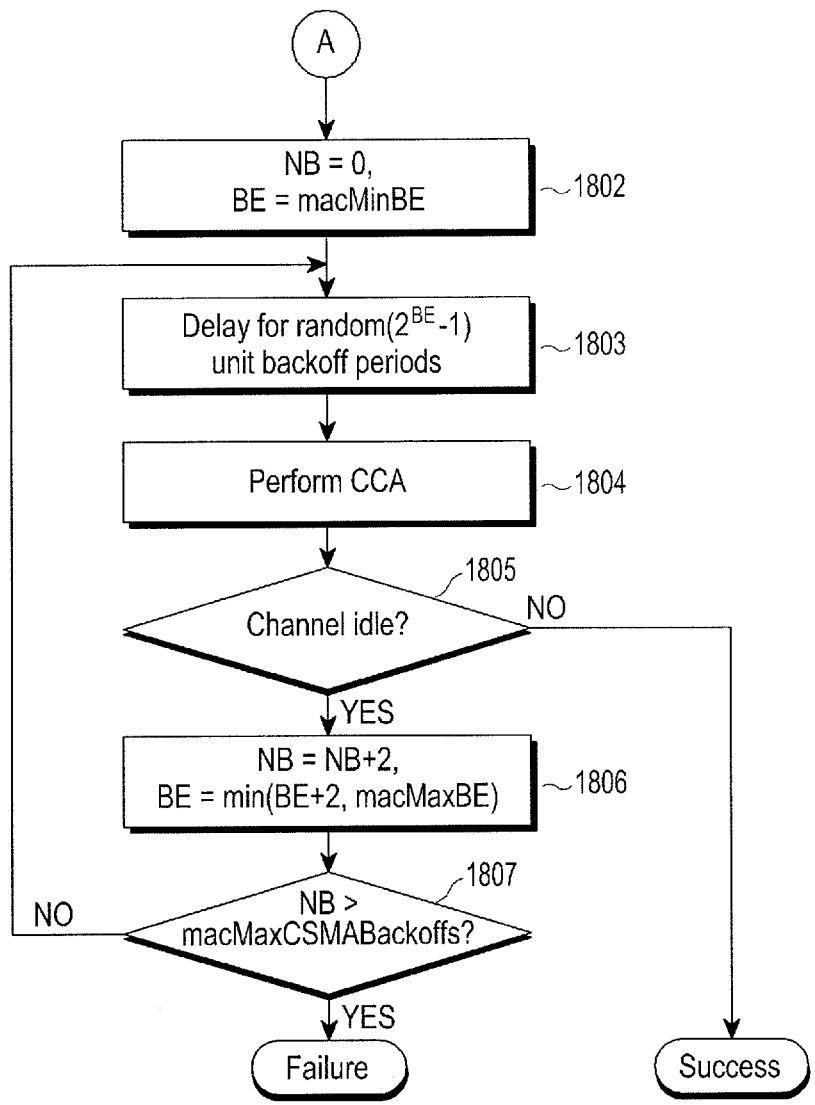

FIGS. 18A and 18B show a flow diagram of a CSMA-CA algorithm in a Background CAP according to an exemplary embodiment of the present invention.

Referring to FIG. 18A, at step 1801 it is determined whether a CSMA-CA operation is a slotted CSMA-CA operation. If it is a slotted CSMA-CA operation, then the process proceeds to step 1808. At step 1808, the NB may be set such that NB=0, and CW may be set such that CW=2. Upon setting NB and CW, the process proceeds to step 1809. At step 1809, it is determine whether battery life extension is required. If battery life extension is not required, then the process proceeds to step 1810 at which BE may be set such that BE=less of (2, macMinBE) and thereafter the process proceeds to step 1812. If at step 1809, it is determined that battery life extension is required, then BE may be set such that BE=macMinBE at step 1811. Thereafter, the process proceeds to step 1812. At step 1812, the back off period boundary is located and the process proceeds to step 1813. At step 1813, a delay for a random number of backoff periods is performed. For example, the delays may be such that a delay of random ($2^{BE}-1$) unit backoff periods is performed. After the delay, the process proceeds to step 1814 at which a CCA on backoff period boundary is performed and the process proceeds to step 1815. At step 1815, it is determined whether a channel is idle.

Referring to FIG. 18A, if the channel is determined to be idle at step 1815, the process proceeds to step 1816 at which a Background CAP is set greater than a Normal CAP in terms of setting values: macMinBE and macMaxBE. In a BE incremental equation in step 1816, BE may be set such that BE=min(BE+2, macMaxBE), and maxCSMAbackoffs may be set small. In an NB incremental equation in step 1816, NB may be set such that NB=NB+2.

NB corresponds to the number of retries due to a backoff made at one access attempt. CW is the number of backoff periods needed to check whether the channel is in an idle state. BE is related to the number of backoff intervals for which a device should wait before performing channel sensing, and the device may select any number from among numbers of 0 to 2BE-1 before its operation.

After step 1816, the process proceeds to step 1817 at which it is determined whether NB is greater than macMaxCSMA-Backoffs. If NB is not greater than macMaxCSMABackoffs, then the process returns to step 1813. If NB is greater than macMaxCSMABackoffs, then the process ends in failure.

If the channel is determined to not be idle at step 1815, then the process proceeds to step 1818 at which CW may be set such that CW=CW-1. After the CW is set, the process proceeds to step 1819 at which it is determined whether CW=0. If CW is determined to not equal 0, then the process returns to step 1814. However, if CW is determined to equal 0, then the process ends in success.

Referring to FIGS. 18A and 18B, if at step 1801 it is determined that the CSMA-CA operation is not slotted, then the process proceeds to step 1802. At step 1802, the NB may be set such that NB=0 and ME may be set such that BE=macMinBe. Thereafter, the process proceeds to step 1803 at which a delay is performed. As an example, the delay may be for a number of unit backoff periods corresponding to random($2^{BE}-1$). Thereafter, the process proceeds to step 1804 at which a CCA is performed. After performing the CCA, the process proceeds to step 1805 at which it is determined whether the channel is idle. If the channel is determined to be idle at step 1805, then the process proceeds to step 1806 at which NB may be set such that NB=NB+2 and BE may be set such that BE=min(BE+2, macMaxBE). Thereafter, the process proceeds to step 1807 at which it is determined whether NB is greater than macMaxCSMABackoffs. If it is determined that NB is not greater than macMaxCSMABackoffs, then the process returns to step 1803. If NB is determined to be greater than macMaxCSMABackoffs, then the process ends in failure.

Conversely, if at step 1805 it is determined that the channel is idle, then the process ends in success.

According to exemplary embodiments of the present invention, even in the same CAZ, differentiated access may be performed based on the queue information exchanged in an MBP in advance, taking into account inter-device QoS.

Figure 19:
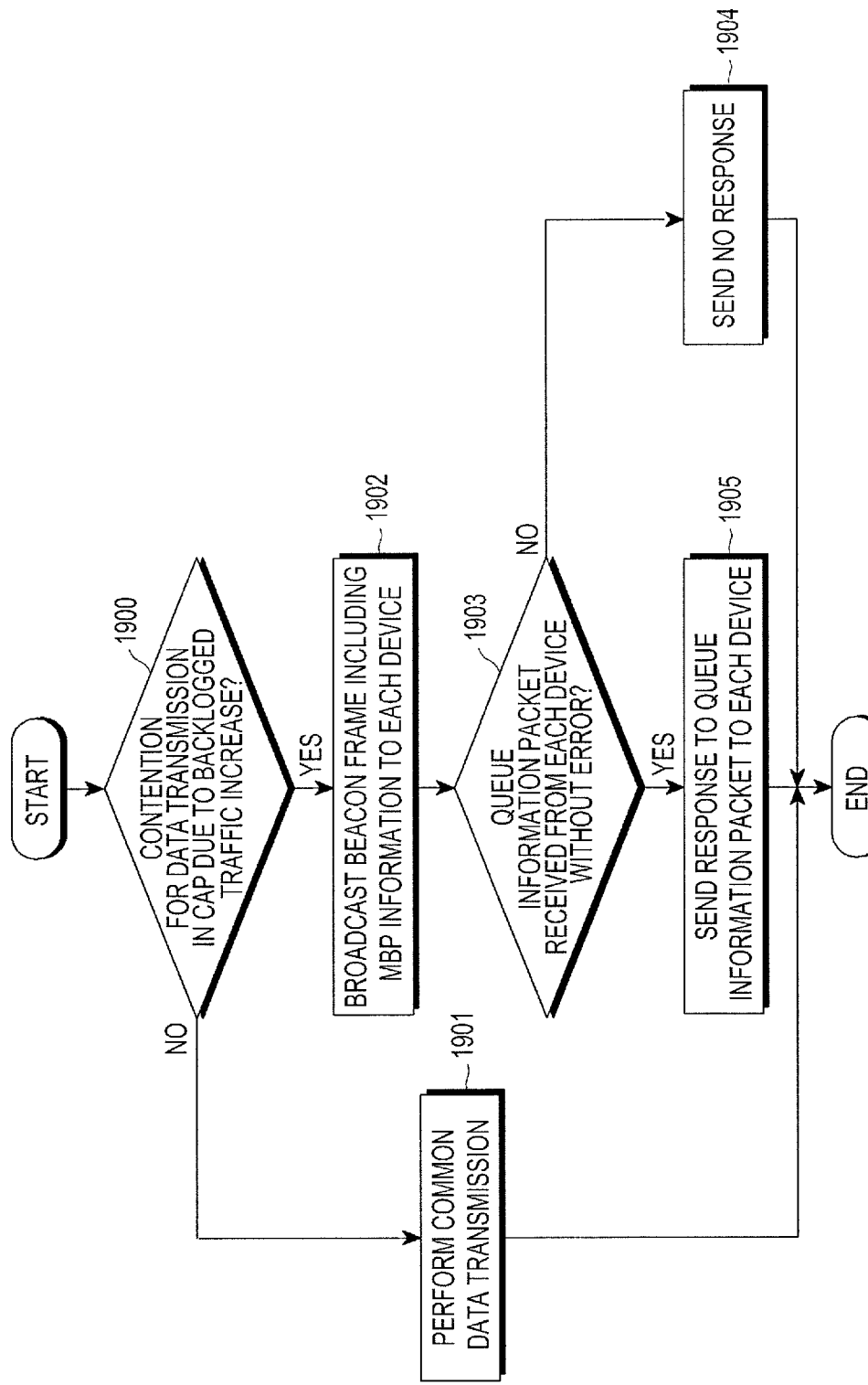
FIG. 19 shows a process of performing load control using an MBP in a coordinator according to an exemplary embodiment of the present invention.

FIG. 19 shows a process of performing load control using an MBP in a coordinator according to an exemplary embodiment of the present invention.

In step 1900, the coordinator 100 determines whether contention for data transmission in a CAP due to backlogged traffic has increased. If the contention has increased, the coordinator 100 proceeds to step 1902. Otherwise, the controller 100 performs common data transmission in step 1901.

In step 1902, the controller 100 generates a beacon frame including MBP information and broadcasts it to devices.

The coordinator 100 determines in step 1903 whether a queue information packet for load control is received from each device without error in an MBP. If the queue information packet is received without error, the coordinator 100 proceeds to step 1905. Otherwise, the coordinator 100 sends no response (or ACK) to each device in step 1904.

In step 1905, the coordinator 100 sends a response to the queue information packet received without error, to each device.

Figure 20:
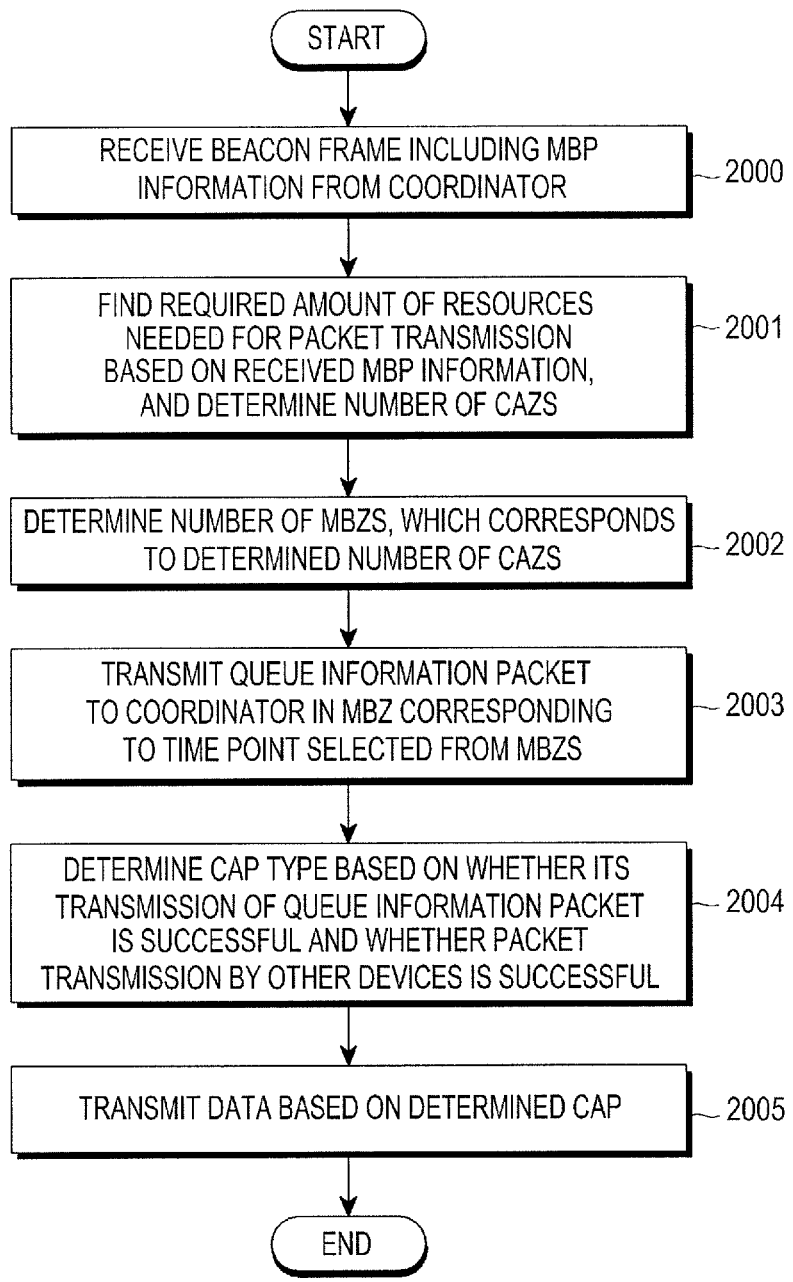
FIG. 20 shows a process of performing load control using an MBP in a device according to an exemplary embodiment of the present invention.

FIG. 20 shows a process of performing load control using an MBP in a device according to an exemplary embodiment of the present invention.

In step 2000, the device 110 receives a beacon frame including MBP information from the coordinator 100.

In step 2001, the device 110 finds the required amount of resources needed for packet transmission based on the received MBP information, and then determines the number of CAZs depending on the found required amount of resources.

In step 2002, the device 110 determines the number of MBZs, which corresponds to the determined number of CAZs. The number of MBZs is equal to the number of CAZs.

In step 2003, the device 110 transmits a queue information packet for load control to the coordinator 100 in an MBZ corresponding to the time point selected from among the determined number of MBZs.

In step 2004, the device 110 determines a CAP type depending on whether its transmission of a queue information packet is successful and whether packet transmissions by other devices are successful. For example, the device 110 may determine any one of an Exclusive CAP, a Normal CAP, and a Background CAP depending on whether its transmission of a queue information packet is successful.

In step 2005, the device 110 performs a data transmission/reception operation using the determined CAP.

For example, upon receiving a response message to the queue information packet from the coordinator 100, the device 110 determines a type of CAP as an Exclusive CAP, determining that its transmission of a queue information packet is successful, and performs data transmission using the determined Exclusive CAP.

If transmissions of a queue information packet by other devices are failed, the device 110 determines a type of CAP as a Normal CAP, and performs data transmission using the determined Normal CAP.

If transmissions of a queue information packet in an MBP are all failed, the device 110 determines a type of CAP as a Background CAP, and performs data transmission using the determined Background CAP.

As is apparent from the foregoing description, in operations of a coordinator and a device, devices participating in packet transmission/reception may receive the packets which are transmitted and received in an MBZ. For example, if another device receives the packet whose address is designated as an address of a specific device, such as unicast, in an MBZ, then the device may demodulate the packet regardless of its original destination so that the packet transmitted/received between the coordinator and the specific device may be delivered to other devices, making it possible to determine whether the packet transmission is successful. In addition, as a destination address of a queue information packet or a response packet is set as a broadcast address, the packet may be delivered not only to the device but also to the coordinator, making it possible to determine whether the packet transmission is successful. In this case, the coordinator broadcasts a response to the received packet.

In this manner, exemplary embodiments of the present invention may enable efficient resource access by performing load control in a distributed manner, for data transmission/reception, thus contributing to a reduction in access delay and power consumption and enabling appropriate QoS control.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A coordinator in a Mutual Broadcast Period (MBP) and Contention Access Period (CAP) operating system for load control, the coordinator comprising:

a Radio Frequency (RF) unit for broadcasting a beacon frame; and a controller for determining whether contention for data transmission in a CAP due to backlogged traffic increases, by recognizing the number of connected devices, for broadcasting a beacon frame including information about an MBP used for load control to each device through the RF unit before the CAP if the contention for data transmission increases, for determining whether a load control broadcast message for determining existence of data load is received in the MBP from the device without error, and for sending a response to the load control broadcast message to the device.

2. The coordinator of claim 1, wherein the information about the MBP includes a length of the MBP and a number of Mutual Broadcast Zones (MBZs).

3. The coordinator of claim 1, wherein the controller sends a response message to the load control broadcast message to the device upon receiving the load control broadcast message without error, and wherein the controller sends no response message to the device if an error occurs in the load control broadcast message.

4. A device in a Mutual Broadcast Period (MBP) and Contention Access Period (CAP) operating system for load control, the device comprising:

a Radio Frequency (RF) unit for receiving a beacon frame broadcasted from a coordinator; and a controller for sending a load control broadcast message for determining existence of data load to the coordinator in an MBP based on information about the MBP upon receiving a beacon frame including information about an MBP used for load control from the coordinator before a CAP, for determining a type of a CAP depending on whether sending of the load control broadcast message is successful and whether packet transmission by other devices is successful, and for performing data transmission using a CAP corresponding to the determined CAP type.

5. The device of claim 4, wherein the controller finds the required amount of resources needed for packet transmission upon receiving the beacon frame from the coordinator, determines the number of Contention Access Zones (CAZs) in the CAP depending on the found required amount of resources, determines the number of Mutual Broadcast Zones (MBZs) in the MBP, which corresponds to the determined number of CAZs, selects any one of the MBZs, the number of which corresponds to the determined number of MBZs, and sends the load control broadcast message to the coordinator in the selected MBZ.

6. The device of claim 4, wherein the type of a CAP includes an Exclusive CAP, a Normal CAP, and a Background CAP.

7. The device of claim 6, wherein upon the receiving of the response message to the load control broadcast message from the coordinator, the controller determines a type of the CAP as the Exclusive CAP, determines whether the sending of the load control broadcast message is successful, and performs the data transmission using the determined Exclusive CAP.

8. The device of claim 6, wherein if the sending of the load control broadcast message to other devices failed, the controller determines a type of the CAP as the Normal CAP, and performs the data transmission using the determined Normal CAP.

9. The device of claim 6, wherein if the sending of the load control broadcast message in the MBP failed, the controller determines a type of the CAP as the Background CAP, and performs the data transmission using the determined Background CAP.

10. A method for operating a Mutual Broadcast Period (MBP) and Contention Access Period (CAP) for load control in a coordinator, the method comprising:
    determining whether contention for data transmission in a CAP due to backlogged traffic increases, by recognizing the number of connected devices;
    broadcasting a beacon frame including information about an MBP used for load control to each device before the CAP, if the contention for data transmission increases;
    determining whether the load control broadcast message is received without error; and
    sending a response to the load control broadcast message to the device.

11. The method of claim 10, wherein the information about the MBP includes a length of the MBP and a number of Mutual Broadcast Zones (MBZs).

12. The method of claim 10, wherein the sending of the response comprises:
    sending a response message to the load control broadcast message to the device upon receiving the load control broadcast message without error; and
    sending no response message to the device if an error occurs in the load control broadcast message.

13. A method for operating a Mutual Broadcast Period (MBP) and Contention Access Period (CAP) for load control in a device, the method comprising:
    receiving a beacon frame including information about an MBP used for load control from a coordinator before a CAP;
    sending a load control broadcast message for determining existence of data load to the coordinator in the MBP based on information about the MBP;
    determining a type of a CAP depending on whether sending of the load control broadcast message is successful and whether packet transmission by other devices is successful; and
    performing data transmission using a CAP corresponding to the determined CAP type.

14. The method of claim 13, wherein the determining of the type of the CAP comprises:
    finding the required amount of resources needed for packet transmission upon receiving the beacon frame from the coordinator;
    determining the number of Contention Access Zones (CAZs) in the CAP depending on the found required amount of resources, and then determining the number of Mutual Broadcast Zones (MBZs) in the MBP, which corresponds to the determined number of CAZs; and
    selecting any one of the MBZs, the number of which corresponds to the determined number of MBZs, and sending the load control broadcast message to the coordinator in the selected MBZ.

15. The method of claim 13, wherein the type of the CAP includes an Exclusive CAP, a Normal CAP, and a Background CAP.

16. The method of claim 15, wherein the determining of the type of the CAP comprises:
    upon receiving a response message to the load control broadcast message from the coordinator, determining a type of the CAP as the Exclusive CAP, and determining whether the sending of the load control broadcast message is successful.

17. The method of claim 15, wherein the determining of the type of the CAP comprises:
    if sending of the load control broadcast message to other devices failed, determining a type of the CAP as the Normal CAP, and performing the data transmission using the determined Normal CAP.

18. The method of claim 15, wherein the determining of the type of the CAP comprises:
    if sending of the load control broadcast message in the MBP failed, determining a type of the CAP as the Background CAP, and performing the data transmission using the determined Background CAP.

* * * * *